United States Patent Office 3,598,867
Patented Aug. 10, 1971

3,598,867
DIBENZOCYCLOHEPTA-TRIENE AND
-DIENE DERIVATIVES
Jean Clement Louis Fouche, Bourg-la-Reine, France, assignor to Rhone-Poulenc, S.A., Paris, France
No Drawing. Filed Oct. 16, 1967, Ser. No. 675,296
Claims priority, application France, Oct. 24, 1966, 81,341
Int. Cl. C07c 63/44
U.S. Cl. 260—515       5 Claims

ABSTRACT OF THE DISCLOSURE

Dibenzocycloheptatriene and dibenzocycloheptadiene derivatives of the formula:

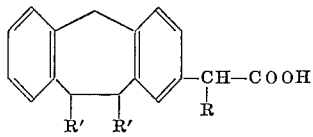

wherein R is hydrogen or methyl and the symbols R' each represent hydrogen or together form a single bond, and pharmaceutically-acceptable salts thereof, are useful as anti-flammatory agents.

---

This invention relates to new dibenzocycloheptatriene and dibenzocycloheptadiene derivatives, to processes for their preparation and pharmaceutical compositions containing them.

The new dibenzocycloheptatriene and dibenzocycloheptadiene derivatives of the present invention are those of the general formula:

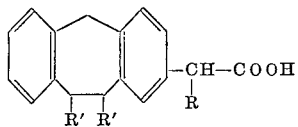

wherein R represents a hydrogen atom or a methyl group and the symbols R' each represent a hydrogen atom or together form a single bond, and salts thereof, for example, alkali metal, alkaline earth metal and amine salts. These new compounds possess useful pharmacodynamic properties; in particular, they are useful as anti-inflammatory agents, and have given good results in physiological experiments with animals when used in doses of 10 to 100 mg. per kilogramme weight of animal. Compounds of importance are those of Formula I in which R represents a hydrogen atom, i.e. 2-dibenzo[a,d]cycloheptatrienylacetic and 2-dibenzo[a,d]cycloheptadienylacetic acid, and their metal salts and salts with nitrogen-containing bases.

According to a feature of the invention, the acids of Formula I, in which R represents a hydrogen atom, are prepared by the process which comprises subjecting a compound of the formula:

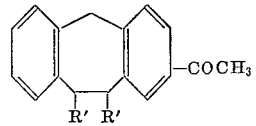

(wherein the symbols R' are as hereinbefore defined) to the Willgerodt reaction or Kindler modification of it, and hydrolyzing by methods known per se the amide or thioamide thus formed.

It is particularly advantageous to subject the compounds of Formula II to the Willgerodt-Kindler reaction using sulphur and morpholine as reagents and to operate at the reflux temperature of the reaction mixture. In this way the dibenzo[a,d]cyclohepta-diene or-triene derivative of the formula:

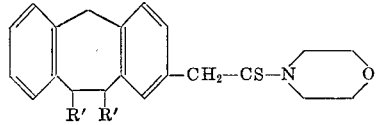

(wherein the symbols R' are as hereinbefore defined) is obtained, which can then be hydrolyzed to the corresponding acid of Formula I, preferably by treatment with potassium hydroxide.

According to another feature of the invention, the acids of Formula I, in which R represents the methyl group, are prepared from corresponding acetyl compounds of Formula II by means of the Darzens reaction followed by oxidation of the resulting aldehydes of the formula:

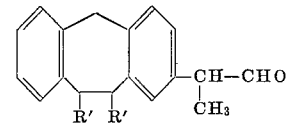

(wherein the symbols R' are as hereinabove defined) to the acid by methods known per se for converting aldehydes to acids. It is particularly advantageous to carry out the Darzens reaction using ethyl chloroacetate as reagent and sodium ethoxide as condensation agent.

2-(2 - dibenzo[a,d]cycloheptatrienyl)propionic acid, viz. the compound of Formula I in which R represents the methyl group and the symbols R' together represent a single bond, is prepared, according to still another feature of the invention, by the process which comprises hydrolyzing and simultaneously decarboxylating a dibenzo[a,d]cycloheptatriene derivative of the general formula:

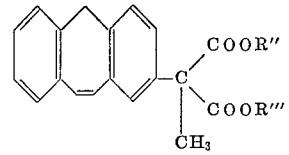

wherein R" and R''' each represent an alkyl group containing 1 to 4 carbon atoms. The process is effected by the usual methods for the hydrolysis and simultaneous decarboxylation of malonic esters; it is advantageous to use sodium hydroxide as reagent and ethanol as solvent medium.

The dibenzo[a,d]cycloheptatriene derivatives of Formula V can be prepared by reacting a reactive ester of the Formula Z—CH₃, wherein Z represents the acid residue of a reactive ester such as a halogen atom or a sulphuric, for example methoxysulphonyloxy, or sulphonic, for example methanesulphonyloxy or toluene-p-sulphonyloxy, residue, with a dibenzo[a,d]cycloheptatrienyl-malonate of the formula:

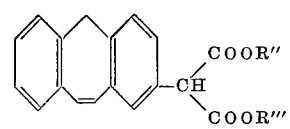

R" and R''' being as hereinbefore defined. The reaction can be carried out by usual methods for the alkylation of malonic esters, i.e. by operating in the presence of a basic condensing agent such as an alkali metal alkoxide, alkali metal amide, or alkali metal, in an organic solvent such as benzene, toluene, ethanol or diethyl ether.

The dibenzo[a,d]cycloheptatrienyl - malonates of Formula VI can be prepared from 2-(dibenzo[a,d]cycloheptatrienyl)acetates of the formula:

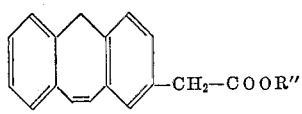    VII (wherein R" is as hereinbefore defined) either directly by the action of an alkyl carbonate of the formula R'''—O—CO—O—R''' (wherein R''' is as hereinbefore defined) or by the action of an alkyl oxalate of the formula (COOR''')$_2$, R''' being as hereinbefore defined, followed by decarbonylation of the resultant product.

The 2-(dibenzo[a,d]cycloheptatrienyl)acetates of Formula VII can be prepared by esterification by methods known per se of the corresponding acid of Formula I.

According to a still further feature of the invention, the dibenzo[a,d]cycloheptadiene derivatives of Formula I, in which the symbols R' each represent a hydrogen atom, are prepared by the reduction of the corresponding dibenzo[a,d]cycloheptatriene compounds in which the symbols R' together form a single bond by methods known per se for the reduction of a double bond in a cycloheptatriene ring. The reduction is preferably carried out using hydrogen under a pressure of 50 to 100 bars and at a temperature between 50° and 100° C. in the presence of palladium on charcoal as catalyst.

The new compounds of general Formula I can be converted into metal salts or addition salts with nitrogenous bases by application of methods known per se. Thus, these salts can be obtained by the action of an alkali metal (for example, sodium, potassium or lithium) or alkaline earth metal base, ammonia or an amine, on an acid of Formula I in an appropriate solvent such as an alcohol, an ether, a ketone, or water; the salt formed is precipitated, if necessary after concentration of the solution, and is separated by filtration or decantation.

In this specification and accompanying claims the term "methods known per se" means methods heretofore used or described in the chemical literature.

For therapeutic purposes the dibenzocyclohepta-triene and -diene derivatives of Formula I are employed as such or in the form of pharmaceutically-acceptable salts, i.e. salts which are relatively innocuous to the animal organism in therapeutic doses of the salts, such as alkali metal, alkaline earth metal, ammonium and amine salts.

The following examples illustrate the invention.

EXAMPLE I 2-acetyldibenzo[a,d]cycloheptatriene (22.0 g.), morpholine (235 g.) and flowers of sulphur (4.85 g.) are heated under reflux (about 125° C.) for 17 hours. After cooling and dilution with distilled water (2.3 litres), the oil which separates is extracted four times with ethyl acetate (total 3.2 litres). The combined organic solutions are washed six times with distilled water (total 6 litres) until they are neutral. After drying over anhydrous magnesium sulphate and evaporation of the ethyl acetate, the crude residue obtained (32.2 g.) is treated with ethanol (950 cc.) and potassium hydroxide pellets (containing about 85% of pure potassium hydroxide; 82.5 g.). The mixture is then heated under reflux for 15 hours. After evaporation of the ethanol, the residue is taken up in distilled water (2.3 litres), and the insoluble matter which appears is extracted twice with diethyl ether (total 2 litres). The clear aqueous alkaline solution obtained is acidified with an excess of concentrated hydrochloric acid ($d$=1.18). The product which separates is extracted four times with diethyl ether (total 4 litres). The combined ethereal solutions are washed four times with distilled water (total 4 litres), dried over anhydrous magnesium sulphate and evaporated. The residue (18.7 g.), M.P. 196–198° C., is recrystallised from acetonitrile (450 cc.) to give finally 2-dibenzo[a,d]cycloheptatrienyl-acetic acid (12.0 g.), M.P. 200–201° C.

The initial 2-acetyldibenzo[a,d]cycloheptatriene is prepared as follows:

2-bromo-11-oxodibenzo[a,d]cycloheptadiene (43.8 g.), M.P. 166° C., is prepared by the cyclisation of 2-(4-bromobenzyl)phenylacetic acid (M.P. 166° C.; 68 g.) in the presence of orthophosphoric acid ($d$=1.71; 165 cc.) and phosphorus pentoxide (280 g.).

2-bromo-11-oxodibenzo[a,d]cycloheptadiene (28.7 g.) is reduced with potassium borohydride (5.4 g.) to yield 2 - bromo-11-hydroxydibenzo[a,d]cycloheptadiene (28.5 g.), M.P. 106° C.

2-bromodibenzo[a,d]cycloheptatriene (M.P. 114–116° C.; 46.4 g.) is prepared by heating the preceding alcohol (51.0 g.) in acetic acid in the presence of 4 N aqueous sulphuric acid.

2-cyanodibenzo[a,d]cycloheptatriene (M.P. 104–106° C.; 29.2 g.) is prepared by heating 2-bromodibenzo[a,d]cycloheptatriene (46.0 g.) in 1-methyl-2-pyrrolidone in the presence of cuprous cyanide.

2-acetyldibenzo[a,d]cycloheptatriene (M.P. 104–105° C.; 22.0 g.) is prepared by the action of methyllithium on the aforesaid cyano derivative (29.2 g.) in anhydrous diethyl ether.

EXAMPLE II 2-dibenzo[a,d]cyclohepatrienylacetic acid (1.5 g.) in solution in acetic acid (60 cc.) is hydrogenated at 70° C. under a pressure of 55 bars for 7 hours in the presence of palladium-on-charcoal catalyst (containing 10% of palladium; 0.15 g.). After cooling and return to normal pressure, the catalyst is filtered off. After diltuion of the filtrate with distilled water (1.2 litres) and cooling at 3° C. for 15 hours, the crsytals which have appeared are filtered off, washed with distilled water and dried under reduced pressure (20 mm. Hg) to give 2-dibenzo[a,d]cycloheptadienylacetic acid (1.43 g.), M.P. 155–157° C.

The present invention includes within its scope pharmaceutical compositions containing, as active ingredient, at least one of the acids of Formula I, or pharmaceutically-acceptable salt thereof, in association with a pharmaceutical carrier or coating. The invention includes especially such preparations made up for oral, parenteral or rectal administration, or topical application, e.g. as ointments or creams.

Solid compositions for oral administration include tablets, pills, powders, and granules. In such solid compositions the active compound is admixed with at least one inert diluent such as sucrose, lactose or starch. The compositions may also comprise, as is normal practice, additional substances other than inert diluents, e.g. lubricating agents, such as magnesium stearate. Liquid compositions for oral administration include pharmaceutically-acceptable emulsions, solutions, suspensions, syrups and elixirs containing inert diluents commonly used in the art, such as water and liquid paraffin. Besides inert diluents such compositions may also comprise adjuvants, such as wetting, emulsifying and suspending agents, and sweetening, flavouring and aromatizing agents. The compositions according to the invention, for oral administration, also include capsules of absorbable material such as gelatin containing the active substance with or without the addition of diluents or excipients.

Preparations according to the invention for parenteral administration include sterile aqueous or non-aqueous solutions, suspensions, or emulsions. Examples of non-aqueous solvents or vehicles are propylene glycol, polyethylene glycol, vegetable oils, such as olive oil, and injectable organic esters such as ethyl oleate. These compositions may also contain adjuvants such as preserving, wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

Compositions for rectal administration are suppositories which contain, in addition to the active substance, excipients such as cacao butter or a suitable wax base.

The percentage of active ingredient in the compositions of the invention may be varied, it being necessary that it should constitute a proportion such that a suitable dosage shall be obtained. The dosage depends on the desired therapeutic effect, on the route of administration and on the duration of the treatment. In human therapy the compositions should generally be administered so as to give between 0.1 and 1.0 g. of active substance per day.

The following examples illustrate pharmaceutical compositions according to the invention.

EXAMPLE III

Tablets weighing 500 mg. and having the following composition are prepared:

| | Mg. |
|---|---|
| 2-dibenzo[a,d]cycloheptatrienylacetic acid | 250 |
| Starch | 190 |
| Colloidal silica | 50 |
| Magnesium stearate | 10 |

EXAMPLE IV

Tablets weighing 200 mg. and having the following composition are prepared:

| | Mg. |
|---|---|
| 2-dibenzo[a,d]cycloheptadienylacetic acid | 50 |
| Starch | 120 |
| Colloidal silica | 27 |
| Magnesium stearate | 3 |

I claim:
1. A dibenzocycloheptatriene or dibenzocycloheptadiene derivative of the formula:

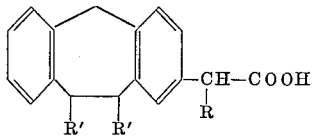

wherein R is hydrogen or methyl and the symbols R' each represent hydrogen or together form a single bond, and mixtures and pharmaceutically-acceptable salts thereof.

2. A dibenzocycloheptatriene or dibenzocycloheptadiene compound according to claim 1 wherein R is hydrogen.

3. A pharmaceutically-acceptable alkali metal, alkaline earth metal, or ammonium salt of a dibenzocycloheptatriene or dibenzocycloheptadiene derivative as claimed in claim 1.

4. The dibenzocycloheptatriene derivative according to claim 1 which is 2-dibenzo[a,d]cycloheptatrienylacetic acid.

5. The dibenzocycloheptadiene derivative according to claim 1 which is 2 - dibenzo[a,d]cycloheptadienylacetic acid.

References Cited

UNITED STATES PATENTS

| 3,228,831 | 1/1966 | Nicholson et al. | 260—515 |
| 3,409,640 | 11/1968 | Villani | 260—370.8 |

JAMES A. PATTEN, Primary Examiner

V. GARNER, Assistant Examiner

U.S. Cl. X.R.

260—247.1, 465, 469, 475, 501.1, 591 592, 599, 618, 649